Patented Aug. 28, 1951

2,565,930

UNITED STATES PATENT OFFICE 2,565,930

TREATING SLAKED LIME AND MAKING PIGMENT THEREFROM

Harold R. Rafton, Andover, Mass., assignor to Raffold Process Corporation, a corporation of Massachusetts No Drawing. Application June 20, 1950, Serial No. 169,287

20 Claims. (Cl. 23—66)

My invention relates to treating slaked lime.

It further relates to treating slaked lime and making pigment therefrom.

The present application is, in part, a continuation of each of my three copending applications, now abandoned, the complete disclosures of which are made a part hereof for purposes of cross reference: Serial No. 69,052, filed January 3, 1949; Serial No. 569,932, filed December 26, 1944; and Serial No. 603,112, filed July 3, 1945. Serial No. 69,052 is a continuation, Serial No. 569,932 a continuation in part, and Serial No. 603,112 also a continuation in part, of my then copending, but now abandoned, application Serial No. 562,273, filed November 6, 1944.

The principal object of my invention is the treatment of slaked lime in the presence of water, particularly in paste or slurry form, whereby it is substantially improved for use as a raw material for further manufacture.

An important object of my invention is the subjection of slaked lime in the presence of water to a mechanical processing action in which shock, attrition or compression of said slaked lime occurs, and the improved slaked lime so produced.

A further object is the manufacture of pigment comprising calcium carbonate by the reaction of treated slaked lime and carbon dioxide, whereby pigment of substantially improved gloss is obtained, e. g. when used as a coating for paper.

A further object is the production of a calcium carbonate which has a relatively high gloss, and which, in certain cases, is capable of being very considerably improved in gloss by further treatment, by conducting a gas containing carbon dioxide into a slurry of treated slaked lime.

A further object is the production of a calcium carbonate which has a relatively high gloss and which is capable of being improved in gloss by further treatment, by projecting or spraying a milk of treated slaked lime into an atmosphere containing carbon dioxide.

A further object is the extension of the range of the conditions under which calcium carbonate of a gelatinous type may be produced, and the production of a whiter and more opaque calcium carbonate of a gelatinous type, as well as the production of such a calcium carbonate having a lower adhesive requirement.

A further object is the manufacture of pigment comprising calcium carbonate by the reaction of treated slaked lime and sodium carbonate, whereby pigment of substantially improved characteristics is obtained, particularly of improved gloss, e. g. when used as a coating for paper.

A further object is the production in the causticizing process of pigment comprising calcium carbonate which has a relatively high gloss, and which, in certain cases, is capable of being very considerably improved in gloss by further treatment.

A further object is the production of pigment comprising calcium carbonate in the causticizing process conducted at a relatively high temperature, which has substantially as fine a particle size as that previously made by causticizing at a temperature below substantially 70° C.

Other objects and advantages of my invention will become apparent during the course of the following description.

Slaked lime is widely employed in the arts as a raw material. Particularly is it used in the manufacture of calcium compounds employed as pigments, fillers, or the like, such as calcium carbonate, fluoride, oxalate, phosphate, silicate, sulphate and sulphite, or compounds or mixtures which contain one or more metallic radicles in addition to calcium, such for example as aluminum as in the case of satin white, titanium as in the case of extended titanium compounds, and antimony, barium, lead, magnesium, zinc, zirconium, or the like in compounds or mixtures containing such metallic radicles. As specific examples: slaked lime may be used in the manufacture of calcium carbonate either by treatment with carbon dioxide, or by treatment with sodium carbonate in the causticizing reaction wherein calcium carbonate is produced concomitantly with sodium hydroxide; or slaked lime may be used to make calcium fluoride with hydrofluoric acid or a soluble fluoride; or slaked lime may be used to make calcium sulphite by reaction with sulphur dioxide, or with a soluble sulphite; or slaked lime may be used to make calcium oxalate, phosphate or sulphate with oxalic acid, phosphoric acid or sulphuric acid, or with a soluble oxalate, phosphate or sulphate, respectively; or to make calcium silicate with sodium silicate; or to make satin white with alum; and the like. All these reactions are well-known in the art.

The improvement which constitutes the present invention comprises subjecting slaked lime in the presence of water to a mechanical processing action in which shock, attrition or compression of said slaked lime occurs whereby the characteristics of the slaked lime are markedly affected, as are the characteristics of the products made from such treated slaked lime.

It is well-known in the art to treat slaked lime in the presence of water prior to use in the manufacture of various pigments. As examples of this prior art treatment, several patents may be cited as illustrative.

For instance, in the Rafton and Brooks Patent No. 2,058,503, issued October 27, 1936, relating to the manufacture of calcium carbonate by the introduction of carbon dioxide into a slaked lime slurry between 15° and 50° C., it is recommended that the lime be slaked under conditions of vigorous agitation. Such agitation may be carried out with a slow moving agitator, for example one having flexible steel fingers, or with a high speed agitator. Examples of such high speed agitators commonly used in the art are propellers and turbo-mixers. In the Statham and Leek Patent No. 2,081,112, issued May 18, 1937, which relates to the manufacture of calcium carbonate by spraying milk of lime into an atmosphere of carbon dioxide gas, it is directed to whip the milk of lime into a spray or mist, for exposure to carbon dioxide, with a series of vanes or blades carried on a shaft.

In the Alton Patent No. 1,379,157, issued May 24, 1921, relating to the manufacture of calcium carbonate by causticizing sodium carbonate with a slaked lime slurry, it is directed to reduce calcium oxide (containing some unburned calcium carbonate) to a finely divided and intimately mixed paste by grinding it in the presence of water (or without water if desired) in a tube mill or a pebble mill, or by passage through mill stones, producing a milk of lime thereby, and then treating it with a solution of sodium carbonate. In the Brooks and Rafton Patent No. 2,062,255, issued November 24, 1936, relating to the manufacture of calcium carbonate by causticizing sodium carbonate below 70° C., it is directed to stir the lime thoroughly during slaking, e. g. with a strong agitating device equipped with flexible steel fingers, prior to the addition of the sodium carbonate. In the Allen and Lynn Patent No. 2,140,375, issued December 13, 1938, in describing the manufacture of calcium carbonate by causticizing sodium carbonate between 25° and 40° C., it is recommended to slake the lime in hot water with vigorous agitation. This procedure is said, by preventing crystal growth, to produce a fine slaked lime, which promotes the fineness of the resulting calcium carbonate. Alternatively the lime may be slaked in cold water, afterwards beating the milk of lime vigorously for a considerable time to bring it to the same condition where it would have been, had it been slaked in hot water. No specific apparatus is recommended for the vigorous agitation and beating of the slaked lime slurry, but in the examples given, adequate stirring in a usual time of 15 minutes is mentioned, so that the equipment ordinarily employed in the art for giving a vigorous agitation or beating to lime slurries, such as the propeller type agitator or turbo-mixer, may be considered as suitable. This is confirmed by actual trial of the method of the patent, the fine calcium carbonate described being obtained when employing such apparatus.

In the O'Connor Patent No. 2,211,908, issued August 20, 1940, relating to the manufacture of calcium carbonate by causticizing sodium carbonate, it is directed to slake the lime with an agitator or high speed mixer, with as high an agitating speed as practical for the slaking operation. Here, again, no specific type of agitator is recommended so that a propeller type or turbo-mixer such as is commonly used in the art, may be considered as suitable. This is also confirmed by actual trials of the method of the patent, the calcium carbonate described being obtained when employing such apparatus. In the Haywood patents, No. 1,984,188, issued December 11, 1934, and No. 2,210,405, issued August 6, 1940, relating to the manufacture of calcium sulphite by spraying milk of lime into an atmosphere of sulphur dioxide gas, it is directed to whip the milk of lime into a spray or mist for exposure to the sulphur dioxide with a paddle wheel device which is similar to that employed in the Statham and Leek patent referred to above.

These patents will suffice to show the prior art practice of treating slaked lime in the presence of water for subsequent use in the manufacture of various kinds of pigments. The prior art practice may be briefly summarized as thoroughly slaking the lime to give a slaked lime containing water, and agitating it thereafter with the help of vigorous stirring such as may be furnished by flexible finger agitators, propeller agitators and turbo-mixers, or grinding the lime with water to an intimate mixture by passage through a tube mill, pebble mill or mill stones, or creating a spray of lime milk with a paddle wheel.

My treatment of slaked lime differs sharply from the prior art practice in that it employs an entirely different order of intensity and/or time, and although it may employ in certain cases one or more pieces of apparatus mentioned in the prior art as being used with slaked lime, the intensity and/or time of the treatment with which such pieces of apparatus is employed in my process brings about an entirely different result from that hitherto obtained. In the practice of my process I subject slaked lime in the presence of water to a mechanical processing action in which shock, attrition or compression of said slaked lime occurs, until an increase of not less than 10% is obtained in its settling test, as hereinafter described. For convenience, "mechanical processing action in which shock, attrition or compression occurs" will hereafter in this specification be abbreviated as "such mechanical processing action." I shall now give examples of such mechanical processing action which, when carried out for a sufficient length of time, will bring about the desired change in the settling test of the slaked lime, together with examples of means for producing it.

I may subject slaked lime to a striking action, in slurry form, or if desired in paste form, e. g. in a Rafton mill (disclosed in my then copending application Serial No. 479,373, filed March 16, 1943, now Patent No. 2,448,049, issued August 31, 1948, the disclosure of which is made a part hereof for purposes of cross reference), or in slurry or paste form in a hammer mill, or in any other suitable apparatus wherein slaked lime may be subjected to a striking action with a velocity of the striking surface or surfaces of not less than substantially 30 feet per second, and preferably greater, e. g. 100 feet per second, or even much greater, e. g. from 200 to 500 feet per second or more. Other examples of suitable apparatus which employ a striking action are equipment employing more or less radial, revolving, striking arms or vanes, and the so-called "squirrel cage" type disintegrators using concentric rows of pins on one or more revolving discs. I may also treat slaked lime by attrition, e. g. in slurry form, as by prolonged milling in a ball mill, pebble mill, tube mill or rod mill, or e. g. in paste form, as by a prolonged kneading action in a pug mill, kneader, Banbury mixer, or the like. I may also subject slaked lime to compression or to compression and attrition, e. g. in a stiff paste form, as in a roller mill with equal speed or differential speed rolls or in an edge runner; or I may use a press, e. g. an hydraulic press, for compression. In using a roller mill, it is sometimes desirable to have one or both the rolls suction rolls to eliminate water, and likewise in using a press, suitable provision should be made to absorb or discharge the water which may be pressed out, as by filter pads or porous drainage surfaces. Or I may treat slaked lime, e. g. in slurry form, by discharging it through a nozzle preferably at high speed, and against a target, if desired. (Ordinary spray nozzles, as well as so-called atomizer nozzles wherein the suction effect of a gas passing over an open end tube induces a flow which is converted into a spray, are not effective due to the relatively low speed at which the slurry passes through such nozzles.) Or I may subject slaked lime in the presence of water to any other such mechanical processing action whereby the slaked lime is markedly changed in its settling characteristic as described below, and whereby it will produce pigments and the like of characteristics markedly different from those produced by slaked lime as treated in prior art processes. If the equipment employed operates in a batch manner, it is operated for the required length of time; if it operates in a continuous manner, the slaked lime may be put through once if that is sufficient, and if not, it may be cycled through the equipment for the required number of times or for the required length of time to obtain the desired effect.

Whereas I may use any of the apparatus indicated above, or any other equipment which will effect the desired change in the slaked lime, my experiments to date have indicated that apparatus employing a striking action appear to give much better results than other types of equipment. Of such apparatus, I find the Rafton mill and the hammer mill particularly effective, and these are, therefore, the preferred apparatus for my treatment of slaked lime. In a Rafton mill it is the teeth of the circular saw, which is usually employed as the rotor element, which strike the material; and in a hammer mill it is the hammers of the rotor element which strike the material. The teeth in the one case and the hammers in the other may be termed the percussive members of the rotor element, and, as is well known, said members propel the material subjected to them away from and out of their path of travel.

The testing procedure which I have so far found most suitable for differentiating slaked lime treated by my process from the slaked lime originally used, as well as from slaked lime treated by prior art processes, is a settling procedure. The specific procedure which I have used is simple and has proved very satisfactory for my purpose. It consists in thoroughly mixing 4.0 grams (dry basis) of slaked lime whether in dry, crumbly, paste or slurry form, with a little water at room temperature, then making up the mixture with further water to exactly 50 cc. in a two ounce bottle graduated in ccs., shaking thoroughly, allowing the mixture to settle overnight, i. e. for 16 hours, and then reading the volume of the settled material in cc. This reading is termed the "settling test," and where herein I speak of a "settling test," I mean the reading obtained when the settling is conducted according to the procedure which I have just specifically described. The difference in settling tests between several samples under examination indicates the difference between the samples.

While any increase in settling test between an original untreated and a treated slaked lime has, of course, some significance, I have found that a 10% increase in the settling test of a treated slaked lime over that of the untreated slaked lime is about the minimum increase which indicates that a change of the type I desire has occurred, and I prefer treated slaked lime which exhibits a much larger increase. The prior art treatments of slaked lime, as will be shown below, result in no, or substantially no, increase in settling test over that of the original slaked lime, and in some cases a decrease is even observed. I find that slaked limes which show at least a 10% increase in settling test after treatment, and preferably a greater increase, yield in the processes in which they are subsequently used, products possessing properties greatly improved in comparison with the properties of products made in a similar manner, but with untreated slaked lime, or with slaked lime treated according to the procedures of the prior art. While I find it highly useful to employ the changed settling test of a treated slaked lime for purposes of differentiation, it is not, however, to be understood thereby that other tests or characteristics of the slaked lime may not also be changed; and, in the claims, where a certain increase in settling test is recited as the criterion of the change effected in the slaked lime, it is to be understood that while such test of itself may not necessarily have any specific use in the employment of the slaked lime, it is, nevertheless, an adequate criterion of the useful change which has taken place.

In order to illustrate the results obtained in my process, I shall present data on the settling tests of slaked limes originally employed and after treatment. I shall also present data on the settling tests of slaked limes originally employed and after subjection to prior art procedures, so that the differences between the settling tests of the slaked limes treated by my process and those subjected to the prior art procedures will be fully demonstrated.

I now give four examples of the practice of my invention.

EXAMPLE 1

I slaked a sample of lime in water, using the water near boiling. I used sufficient water to produce a final mud-like consistency, which required about 3 parts by weight of water to 1 part by weight of lime with the particular lime employed. I agitated the lime during the slaking, and then, after the slaking was completed, I diluted the slaked lime conveniently to approximately 20% dry concentration (of slaked lime), and then subjected it to my preferable procedure of screening it through a fine mesh wire cloth. I used 150 mesh, but any fine mesh may be used as desired. I then passed the screened slaked lime slurry through a Rafton mill, the rotating element (circular saw) of which had a peripheral velocity of approximately 460 feet per second. Whereas once through the mill gives an appreciable result, I passed the slaked lime slurry by preference through the mill a plurality of times, in the present instance 20 passes. Any number from 1 to 20 passes or more is suitable, according to the results desired.

EXAMPLE 2

I slaked another sample of lime as in Example 1, diluted and screened it, then concentrated it to a soft paste form about 33% dry concentration, and passed it through a hammer mill, in the present instance by introducing it radially through a port in the side of the casing by means of a screw conveyor into the path of the rotating hammers, although the slaked lime may be otherwise introduced as convenient. The hammers had a peripheral velocity of approximately 350 feet per second, and discharged the treated slaked lime directly through an opening at the bottom of the mill. The treated slaked lime may of course be discharged through a screen or grid but I prefer the open discharge. I used 10 passes, but here, as in the case of the Rafton mill treatment once through the mill gives an appreciable result, and any number of passes from 1 to 20 or more may be used according to the results desired.

EXAMPLE 3

I slaked another sample of lime as in Example 1, screened it and concentrated it sufficiently to form a heavy slurry, approximately 30% dry concentration, and then subjected it to a prolonged treatment in a pebble mill. The time of treatment required depends, among other things, upon the diameter of the mill because larger diameter mills act proportionately more rapidly than smaller diameter mills, but in a laboratory mill usually from 4 to 16 hours, more or less, is desirable, and in the present instance I used a 12 hour period. In any event, the time required is very much longer than that necessary for merely reducing it to a finely divided intimate mixture or the like, for which a period of some 15 minutes in a laboratory mill is usually sufficient.

EXAMPLE 4

I used a sample of the same slaked lime as in Example 3, and concentrated it to a thick paste form at about 44% dry concentration. I then subjected it to a prolonged treatment in a kneader. Here, as in the case with a pebble mill, the time of treatment required depends upon several variables, among others upon the type of kneader and its speed of operation, but in laboratory kneaders a treatment usually of 2 to 12 hours, more or less, is desirable, and in the present instance I used an 8 hour period.

In order to compare slaked lime treated by my present invention with slaked lime treated by the prior art practice, I have treated slaked lime by the five following illustrative prior art procedures:

PROCEDURE A

I agitated with extreme vigor a sample of lime slaked as in Examples 1–3, using a propeller agitator revolving at a speed of about 1760 R. P. M., for a period of 15 minutes, the slaked lime being at a soft pasty consistency of approximately 32% dry concentration.

PROCEDURE B

I agitated with extreme vigor a sample of the same slaked lime as used in Procedure A, using a turbo-mixer agitator revolving at a speed in the neighborhood of 1000 R. P. M., for a period of 15 minutes, the slaked lime being at a heavy slurry consistency of approximately 29% dry concentration. I removed a sample for test, and then continued the treatment for a period of 105 minutes, making a total treatment of 2 hours, or eight times as long as that of the sample removed for test after 15 minutes.

PROCEDURE C

I subjected a sample of lime slaked as in Examples 1–3, in heavy slurry form at a dry concentration of about 30%, to a grinding treatment in a pebble mill for 15 minutes, which was sufficient to reduce it to a finely divided intimate mixture.

PROCEDURE D

I subjected a sample of lime slaked as in Examples 1–3, diluted to a slurry of approximately 11% dry concentration for one hour to a paddle wheel agitator mounted on a horizontal shaft, the tip of the lowermost paddle dipping into a pool of the slaked lime slurry. The shaft was revolved at about 520 R. P. M., giving the paddle tips a peripheral speed sufficient to produce a fine spray.

PROCEDURE E

I slaked a sample of lime by the method used in the previous examples and procedures, namely in water near boiling, using sufficient water to give a final mud-like consistency, in this case 3½ parts by weight of water to 1 part by weight of lime, agitating the lime during slaking, and then screened the slaked lime after dilution. I then slaked a second sample of the same lime in cold water, using 8⅓ parts by weight of water to 1 part by weight of lime, without agitation, and then screened directly this slaked lime, which was in the form of a thin slurry of approximately 14% dry concentration. I then agitated this latter sample of slaked lime slurry with extreme vigor, using a propeller agitator revolving at a speed of about 1760 R. P. M., for a period of 30 minutes. (Note.—In all the above examples and procedures, the slaked lime was screened in every case, even though that step is not specifically mentioned.)

I have determined the settling tests of the samples of slaked lime treated in Examples 1–4 and Procedures A–E, as well as of the original slaked lime used in all of the examples and procedures. The results are tabulated in Tables I and II below:

Table I.—Treatment according to present invention

| Example | Material | Settling test | Per cent increase in settling test based on the settling test of the original slaked lime |
|---|---|---|---|
|  | Original slaked lime used in Ex. 1. | 18 |  |
| 1 | Slaked lime treated in Rafton Mill. | 36 | 100 |
|  | Original slaked lime used in Ex. 2. | 18 |  |
| 2 | Slaked lime treated in hammer mill. | 30 | 67 |
|  | Original slaked lime used in Exs. 3 and 4. | 20 |  |
| 3 | Slaked lime treated by prolonged pebble milling. | 26 | 30 |
| 4 | Slaked lime treated by prolonged kneading. | 23 | 15 |

*Table II.—Treatment according to prior art practice*

| Procedure | Material | Settling test | Per cent increase in settling test based on the settling test of the original slaked lime |
|---|---|---|---|
| A | Original slaked lime used in Procedures A and B. | 22 | |
|  | Slaked lime agitated extremely vigorously with propeller agitator. | 20 | −9 |
| B | Slaked lime agitated extremely vigorously with turbo-mixer agitator. | 20 | −9 |
|  | Same, but agitated for eight times as long. | 21 | −5 |
| C | Original slaked lime used in Procedure C. | 20 | |
|  | Slaked lime ground to finely divided intimate mixture in pebble mill. | 20 | 0 |
| D | Original slaked lime used in Procedure D. | 19 | |
|  | Slaked lime whipped to a spray with paddle agitator. | 19 | 0 |
|  | Slaked lime, slaked in hot water, thick. | 23 | |
|  | Original slaked lime used in Procedure E, (same lime used for slaking as in test directly above), slaked in cold water, thin. | 23 | |
| E | Slaked lime agitated extremely vigorously with propeller agitator. | 23 | 0 |

It will be seen from Table I that in every case the subjection of slaked lime to such mechanical processing action according to my invention (Examples 1–4) brings about a marked increase in settling test over that of the original slaked lime, whereas, on the contrary, it will be seen from Table II that the treatment of slaked lime according to the prior art practice (Procedures A–E) brings about substantially no increase in settling test over that of the original slaked lime, and, indeed, in some cases it even causes a small decrease. It is thus apparent that my treatment of slaked lime differs completely from the prior art treatment.

I have found that the increase in the settling test of a given slaked lime brought about by such mechanical processing action to which I subject it, gives reliable evidence of very important improvement in the quality of the pigments which are obtained from such treated slaked lime when the treated slaked lime is subjected to subsequent pigment forming reactions, whereby pigments, detailed examples of which will be given later herein, are obtained much superior to those obtained from slaked lime either untreated or treated according to the prior art practices. It is thus apparent that a great advance has been made in the art of treating slaked lime, and that my process will produce slaked lime from which improved pigments can be simply and inexpensively manufactured.

Lime may be slaked with only enough water to give a dry or substantially dry product, which is termed "hydrated lime." This is a special kind of slaked lime which I will discuss in detail later herein. Or lime may be slaked with a moderate excess of water to a crumbly form containing water, or with more water to give a thick mud, or with a still larger quantity of water to give a slurry. The temperature of the water used may be anywhere from cold to boiling, and the lime may be slaked with or without agitation. The lime is usually slaked at atmospheric pressure, but superatmospheric pressure may be used, or, indeed, subatmospheric pressure. With most of the limes with which I have had experience, the best results are obtained by slaking the lime in hot water near the boiling point using enough water to give a heavy mud-like consistency to the slaked lime, and employing vigorous agitation. Therefore this is my preferred method of slaking and the one which is shown in Examples 1–4 herein. It has been asserted that, when the slaking is conducted with enough water to give a thick consistency, such as a mud or the like, and the slaking is conducted under vigorous agitation, the cooler the slaking the better the results; but while this is doubtless true with certain limes, in most cases it would appear that the optimum results are obtained by hot slaking. However, I may, if I desire, use cold water in slaking, in which case a relatively large proportion of water to the lime, e. g. some six to ten parts of water to one part of lime, should ordinarily be employed if it be desired that the final temperature of the slaked lime should not be boiling or even very hot; and, also if I desire, I need not employ agitation. Usually, as stated, relatively low temperature slaking gives poorer results, but, as indicated above, there are limes which slake well under these conditions. Such a situation is exhibited by the lime used in Procedure E above (Table II), which lime, when slaked in cold water to a thin slurry without agitation, gave the same settling test as when slaked in hot water to a thick mud with agitation.

In those cases where lime slaked cold without agitation, or even with agitation, to a mud or slurry, does not give as high a settling test as the same lime slaked hot with agitation to a mud or slurry, a subsequent vigorous agitation of such lime slaked cold without agitation will sometimes convert it to a condition where it possesses substantially as high a settling test as if the lime were slaked hot with agitation and also if the lime is originally slaked cold but with some original agitation, the same result may sometimes be obtained with a less vigorous subsequent agitation. However, where a lime is slaked cold to a mud or slurry, whether or not the lime is agitated during the slaking, and where it is necessary to agitate it more or less vigorously after slaking to improve its quality, this cold slaked lime is merely by this subsequent agitation brought up to approximately the settling test which it would have possessed had the lime originally been slaked under the best conditions, which for such a lime, is usually hot with agitation. My invention, of course, does not relate to such a procedure whereby lime slaked under less favorable conditions is merely improved to the quality which it would have possessed had it been slaked under optimum conditions. Therefore, where I speak of treating slaked lime until an increase is effected in its settling test of not less than a given percentage of the "original value of said test," it is to be understood that I mean that said original value shall have been determined on the slaked lime in question when slaked under substantially the optimum slaking conditions for that particular lime.

If the lime is slaked to a slurry, it may be used in that condition, or concentrated before use if desired. If the lime is slaked to a thick mud, it may be used in that condition, or diluted and used in a diluted condition or it may be reconcentrated, e. g. to a paste form, before use, The usual reason for the latter procedure is that while it is desirable to slake a lime thick and to use it thick, it may also be desirable to screen the slaked lime before use, and inasmuch as it is usually necessary to dilute the slaked lime to screen it effectively, especially through a fine mesh, an intermediate diluting sometimes is useful followed by a reconcentration. I may also, if desired, treat the slaked lime prior to screening as my treatment tends to reduce any grit present. The slaked lime may then be screened subsequent to my treatment, or not, as desired. My preferred method, however, is to screen the slaked lime in slurry form before treatment as this avoids contaminating the treated slaked lime with any impurities present in the original slaked lime; and my preferred methods of treatment, in their entirety, are those shown in Examples 1 and 2 above.

Instead of employing slaked lime in slurry or paste form which is my preferred practice, I may employ it in somewhat moist form, e. g. in the crumbly form already referred to. The amount of water required to slake a lime originally to a crumbly form, or to convert a slaked lime which has been dried to a crumbly form, will vary with the lime and other conditions, but the amount of water finally present in such a crumbly product will usually run from 30 to 40%, more or less. When using such lime in crumbly form, I employ, of course, the appropriate equipment at the proper intensity and/or time of treatment for effecting the desired change in the slaked lime, for example, a prolonged treatment in a kneader.

My process is not operable with lime slaked with an excess of water, then dried, and used dry. In order to illustrate the inoperability of my process with such dry slaked lime, I cite the following tests wherein lime slaked to a thick mud hot with agitation, was diluted to a slurry, screened, concentrated and then dried, and the dried slaked lime, in dry condition, subjected to two types of such mechanical processing action, one by passing it through a hammer mill (the hammers having a peripheral velocity of approximately 350 feet per second), and the other by subjecting it to prolonged (8½ hour) milling in a pebble mill. The results of these tests are given in Table III.

*Table III.—Treatment of lime slaked thick, then dried*

| Material | Treatment | Settling test | Per cent increase in settling test based on the settling test of the original slaked lime dried |
|---|---|---|---|
| Lime slaked thick, then dried. | None | 18 | |
| Do | In hammer mill | 18 | 0 |
| Do | Prolonged milling in a pebble mill. | 13 | −39 |

It will be seen from Table III that when lime, slaked in thick form and then dried, is subjected dry to such mechanical processing action, the settling test is not increased, and sometimes is even decreased substantially.

If I desire, I may use hydrated lime, to which I have referred previously herein. If hydrated lime is used, it must be used in the presence of water, because hydrated lime, when treated dry— as is the case with lime slaked in excess of water, dried and then treated dry—shows substantially no increase in settling test when subjected to such mechanical processing action. However, when subjected to such mechanical processing action in the wet condition, it does show a substantial increase. The tests presented in Table IV are illustrative of the effect of subjecting hydrated lime in its customary dry or substantially dry condition to two types of such mechanical processing action, one by passing it through a hammer mill (the hammers having a peripheral velocity of approximately 350 feet per second), and the other by subjecting it to a prolonged (8 hour) milling in a pebble mill, as compared with subjecting it when in wet form to such mechanical processing action, in this case a prolonged (10 hour) milling in a pebble mill. The lime employed was a good grade of commercial hydrated high calcium lime.

*Table IV.—Treatment of hydrated lime*

| Material | Treatment | Settling test | Per cent increase in settling test based on the settling test of the original hydrated lime |
|---|---|---|---|
| Hydrated lime, dry | None | 13 | |
| Same | In hammer mill | 10 | −23 |
| Same | Prolonged milling in a pebble mill. | 12 | −8 |
| Hydrated lime, mixed with water to a heavy slurry. | do | 23 | 78 |

It will be seen from Table IV that when hydrated lime, in its customary dry form, is subjected to such mechanical processing action, such as treatment in a hammer mill or prolonged pebble milling, the settling test is decreased; whereas when hydrated lime, in wet form, is subjected to such mechanical processing action, such as prolonged pebble milling, its settling test is substantially increased. Thus I may use hydrated lime, but only, as previously indicated, in the presence of water. However, as the expense of producing hydrated lime in its customary dry form, and then adding water before treatment, is considerably greater than the cost of slaking quicklime to a paste or slurry directly preceding treatment, hydrated lime is not my preferred form of slaked lime.

While I have mentioned my treatment as being given the lime after slaking, it may of course be given during the slaking, preferably being continued thereafter, or it may be given even while pigment is being made therefrom, but this is not my preferred procedure, as it is not usually as convenient nor as efficient as treatment after slaking and before pigment is made therefrom.

The slaked lime I have referred to so far herein is that obtained by slaking ordinary high calcium lime, but my process is equally applicable to lime containing magnesia, which has been slaked, such as slaked dolomitic lime, with which, in general, comparable results are obtained. For example, a sample of dolomitic lime, after being slaked hot with agitation to a thick mud, gave a settling test of 14. This slaked lime, after subjecting it to such mechanical processing action, in this case to a milling in slurry form for 11⅔ hours in a pebble mill, gave a settling test of 21, an increase of 50% over the settling test of the original slaked lime.

I may, if desired, treat the slaked lime in the presence of an addition agent, such as a dispersing agent, e. g. an alkali metal pyrophosphate, tetraphosphate, or hexametaphosphate such as "calgon," or the like, or polymerized sodium salts or alkyl naphthalene sulphonic acids (alkyl long chain) such as "Daxad No. 11," or in the presence of a wetting agent, a large number of which are well-known in the art, and this use of addition agents may, at times, have a beneficial effect on my process, such as increasing its efficiency. In some cases, however, the presence of a dispersing agent of itself may lower somewhat the settling test of the original slaked lime, but the subjection to such mechanical processing action then increases it, although in some cases not to so high a point as in the absence of the dispersing agent. I may also treat the slaked lime in the presence of an adhesive which may also have a beneficial effect on the efficiency of my process. Examples of suitable adhesives are casein or other protein or protein-like material derived e. g. from milk or from soya beans, modified starches, glue or the like. Some of the addition agents may act as thinning agents. The utility of a thinning agent arises from the fact that it permits slaked lime in paste form to be converted into a slurry of a higher dry content than could otherwise be obtained, and thus allows those types of apparatus which operate on a slurry to operate more efficiently.

Any of the above mentioned addition agents is usually employed in an amount ranging from a small fraction of 1% up to about 5% on the slaked lime, depending upon the material used and the effect desired. However sometimes more may be used to advantage, e. g. up to 8% or more of alpha protein (derived from soya beans), which gives an excellent thinning effect at such percentage. Casein derived from milk gives a thinning effect, using about 4%. The addition agents are usually added in solution, but may be added in moist form, or in some cases in dry form if desired. As mentioned above, some addition agents affect the settling test, so that it is desirable to conduct the settling test in the absence of addition agents. In some cases the addition agent may be removed after treating slaked lime in the presence thereof, e. g. by washing, before making the settling test on the treated slaked lime. If this is not feasible, the settling test may be made on the slaked lime which has been given the desired treatment in the absence of the addition agent; and the addition agent may then be used during the treatment on the basis of the procedure determined in its absence. It should be emphasized that suitable addition agents are useful to produce improved results such as indicated, but that they do not alter the essential nature of the process. These addition agents add expense to the process and any improved result obtained must be balanced against the added cost in any given case. Furthermore it must be ascertained whether or not the presence of any given agent will be advantageous, or without effect, or disadvantageous, in the use to which the slaked lime is subsequently to be put, and that factor must also be taken into consideration.

I have tried subjecting quicklime, e. g. in powder form, to such mechanical processing action, such as grinding in a pebble mill for a period of eight hours, both alone, and in the presence of a small amount of carbon black as a grinding aid or anti-compacting agent; but in neither case was there any increase in the settling test of the treated lime after slaking when compared with the settling test of the original lime after slaking. Hence my process does not appear to be applicable to quicklime.

I shall now give examples of pigments produced by reaction of slaked lime, treated as described herein, with a reagent adapted to produce a carbonate with said slaked lime, in the first instance with carbon dioxide, and in the second with an alkaline earth carbonate such as sodium carbonate.

Having treated my slaked lime by subjection in the presence of water to such mechanical processing action until an increase is effected in its settling test of not less than 10% of the original value of said test, I then subject it to carbonation with carbon dioxide to form calcium carbonate, if it be a high calcium lime, or to form calcium carbonate magnesium hydroxide or calcium carbonate magnesium basic carbonate or the like if it be a lime containing magnesia such as dolomitic lime.

In order to illustrate the results obtained in my process I present data on pigment comprising calcium carbonate made according to my process employing slaked lime which has been subjected in the presence of water to such mechanical processing action. I also present data on corresponding pigments made according to prior art procedures wherein the slaked lime has not been subjected to such action, so that the differences between the pigments made by my process and those made by the prior art processes will be fully demonstrated.

As stated previously, while I may use any of the apparatus indicated for subjecting slaked lime to such mechanical processing action, I prefer the Rafton mill and the hammer mill as they are particularly effective. In order to prepare the slaked lime for production of pigment comprising calcium carbonate upon which data is presented herein, I treated some slaked lime in the presence of water in a Rafton mill, and also treated some in a hammer mill, according to illustrative procedures F and G.

PROCEDURE F

This is the same sample of high calcium lime treated in Example 1 above, with the results shown in Table I.

PROCEDURE G

I slaked a sample of dolomitic lime in water, using the water near boiling. I used sufficient water to produce a final mud-like consistency, which required about 2 parts of water to 1 part by weight of lime with the particular lime employed. I agitated the lime during the slaking, and then, after the slaking was completed, I diluted the slaked lime to a proper consistency for screening, about 32%, screened it through 150 mesh wire cloth, then concentrated it to a paste form about 50% dry concentration, and passed it through a hammer mill, in the present instance by introducing it radially through a port in the side of the casing by means of a screw conveyor into the path of the rotating hammers, although the slaked lime may be otherwise introduced as convenient. The hammers had a peripheral velocity of approximately 350 feet per second, and discharged the treated slaked lime directly through an opening at the bottom of the mill. The treated slaked lime may of course be discharged through a screen or grid but I prefer the open discharge. I used 10 passes but here, as in the case of the Rafton mill treatment, once through the mill gives an appreciable result, and any number of passes from 1 to 20 or more may be used according to the results desired. The slaked lime before treatment in the hammer mill had a settling test of 17, and after treatment had a settling test of 22, an increase due to treatment of 29% based on the original test.

I then subjected the slaked lime of Procedures F and G to carbonation in a number of different ways of which the following examples are illustrative:

EXAMPLE 5

I subjected the slaked lime treated in Procedure F, in slurry form, to gas containing carbon dioxide by leading the gas into the body of the slurry under its surface according to that method of gas introduction as described in the Rafton and Brooks Patent No. 2,058,503, and I employed an apparatus similar to that described therein. The concentration of the carbon dioxide in the gas employed was approximately 22%, and the concentration of the slaked lime slurry carbonated was such that, after carbonation was completed, the slurry contained approximately 13% calcium carbonate by weight. The temperature of carbonation was approximately 24° to 27° C. A propeller agitator was used revolving at a speed of 1760 R. P. M. which produced vigorous agitation in the carbonating vessel, which was of a vertical cylindrical type.

I then carried out a companion experiment, like Example 5 in every respect except that the slaked lime before carbonation, instead of being subjected to such mechanical processing action as defined herein, was treated according to the prior art practice by subjecting it to vigorous agitation, as described in Patent No. 2,058,503.

The calcium carbonate produced in Example 5 and in its prior art companion experiment were tested as follows: for per cent adhesive requirement (in this case casein requirement) by the usual test employed in the art, i. e. spreading on paper successive aqueous calcium carbonate-casein mixes containing various percentages of casein, until a mix was obtained strong to No. 5, but weak to No. 6, Dennison wax; for oil absorption by the usual linseed oil rub-out method; and for percent gloss by calendering coated sheets (of the proper strength as produced in the above adhesive strength test), giving each sheet two passes through a nip of a calendar for coated paper and determining the per cent gloss on an Ingersoll glarimeter. The physical characteristic as to gelatinous or non-gelatinous quality of the calcium carbonate was also observed. The results are given in Table V.

Table V

| Calcium Carbonate | Physical characteristic | Per cent casein requirement | Oil Absorption | Per cent gloss |
| --- | --- | --- | --- | --- |
| Example 5 | Gelatinous | 28 | 50 | 70 |
| Companion prior art. | Non-gelatinous | 45 | 63 | 56 |

It will be noted that Example 5 calcium carbonate shows a lower casein requirement, a lower oil absorption and a higher gloss than the prior art calcium carbonate, all of which represent a marked improvement in quality, as lower casein requirement and oil absorption are advantageous, while a higher gloss is a characteristic particularly desired. Of course, also, the gelatinous calcium carbonate has a much higher settling test than the non-gelatinous.

By the term "gelatinous" as used in the above table and elsewhere herein I mean that the pigment comprising calcium carbonate so designated, exhibits a very slow filtration rate, has a rather soft and unctuous feeling in filter cake form, exhibits marked shrinking on drying, and dries to a cake which does not powder readily by slight crushing pressure of the fingers but is rather hard and breaks down difficultly under moderate pressure, and at the extreme end of the range designated by the term, has rather horny characteristics when dried, and breaks up into a powder form with considerable difficulty. This gelatinous feature is much desired as the property of high gloss accompanies this characteristic, and when operating the process of Patent No. 2,058,503 according to prior art practice, under conditions otherwise similar to the companion experiment shown above, excepting only as to concentration of the calcium carbonate in the slurry, it was necessary, in order to obtain a gelatinous calcium carbonate, to use a concentration not substantially higher than 5%. As the prior art operation at such a low concentration greatly reduces the output of equipment and also gives great difficulty when filtering or otherwise dewatering dilute slurries, the operation according to my present process at a much higher concentration, such as approximately 13% or even higher, e. g. at about 15% or thereabout, extending as it does the range of concentration at which gelatinous calcium carbonate may be produced, is much superior. Moreover, gelatinous calcium carbonate obtained under the prior art conditions, although it gives a high gloss, has the disadvantage that it possesses a slightly yellow tinge and a rather poor opacity. The gelatinous calcium carbonate of Example 5, however, is unexpectedly, markedly whiter and much more opaque, both highly desirable qualities, and additionally has in most cases a lower adhesive requirement. Thus by my present process I have achieved all these valuable advantages.

EXAMPLE 6

I subjected the slaked lime treated in Procedure F to gas containing carbon dioxide in the same manner and in the same apparatus as used in Example 5, the only differences in conditions being that the concentration of the slaked lime slurry used was such as to give approximately 20% calcium carbonate by weight after carbonation rather than the approximately 13% of Example 5, and the temperature of carbonation was approximately 40° C. instead of the approximately 24-27° C. of Example 5.

I then carried out a companion experiment, like Example 6 in every respect except that the slaked lime before carbonation, instead of being subjected to such mechanical processing action as defined herein, was treated according to the prior art practice by subjecting it to vigorous agitation as described in Patent No. 2,058,503.

These two calcium carbonates, as well as all the other pigments comprising calcium carbonate described in the subsequent examples, were of a non-gelatinous nature, and thus do not give so high a gloss as the Example 5 calcium carbonate.

The calcium carbonates produced in Example 6 and in its prior art companion experiment were tested similarly to the calcium carbonates of Example 5 and its companion experiment, and the results are given in Table VI.

Table VI

| Calcium Carbonate | Per cent casein requirement | Oil absorption | Per cent gloss |
|---|---|---|---|
| Example 6 | 22 | 49 | 54 |
| Companion prior art | 24 | 47 | 49 |

It is to be noted that Example 6 calcium carbonate of the present invention shows a slightly lower casein requirement, a slightly higher oil absorption, and a higher gloss than the prior art calcium carbonate. The higher gloss, with the other characteristics fairly close respectively to one another, represents a desired improvement in quality.

Example 6 calcium carbonate and its companion prior art calcium carbonate were then subjected to a treatment to improve the casein requirement, oil absorption and gloss, in this case the treatment disclosed in my Patent No. 2,451,448, issued October 12, 1948, namely by passing the calcium carbonates in paste form through a hammer mill, in the present instance employing 10 passes. Tests were then made on the so treated calcium carbonates and the results are given in Table VII.

Table VII

| Calcium Carbonate | Per Cent casein requirement | Per cent reduction in casein requirement based on the original (in Table VI) as 100% | Oil absorption | Per cent reduction in oil absorption based on the original (in Table VI) as 100 | Per Cent Gloss | Per cent increase in gloss based on the original (in Table VI) as 100% |
|---|---|---|---|---|---|---|
| Example 6, passed through hammer mill 10 times | 10 | 55 | 32 | 35 | 63 | 17 |
| Companion prior art, passed through hammer mill 10 times | 11 | 54 | 32 | 32 | 52 | 6 |

It will be noted by comparison of Table VII with Table VI, that both calcium carbonates are improved by the treatment given them. Comparing Example 6 calcium carbonate with the companion prior art calcium carbonate, it will be seen that its casein requirement is slightly lower, its oil absorption the same, and particularly, that its improvement in gloss is considerably greater. This shows that not only is Example 6 calcium carbonate of the present invention of better gloss as originally produced, but that it is also susceptible to greater improvement in gloss by subsequent treatment than is the companion prior art calcium carbonate.

EXAMPLE 7

I subjected the slaked lime treated in Procedure F to gas containing carbon dioxide in the same manner and in the same apparatus as used in Example 6, the only difference in conditions being that the temperature of carbonation was approximately 54–57° C. instead of the approximately 40° C. of Example 6.

I then carried out a companion experiment, as before, like Example 7 in every respect except that the slaked lime, instead of being subjected to such mechanical processing action, was treated according to the prior art practice by subjecting it to vigorous agitation.

The technique of carbonation of Patent No. 2,058,503 was employed in making the calcium carbonate of Example 7 and that of the companion experiment, but as these were made in a temperature range above that of the process of Patent No. 2,058,503, they did not have the colloidal characteristics of the calcium carbonate produced according to the process of said patent. The Example 7 and companion calcium carbonates, after being produced, were tested as previously, and then they were subjected to the same subsequent treatment as given the Example 6 and its companion prior art calcium carbonate, namely they were passed 10 times through a hammer mill, and the so-treated calcium carbonates were tested. The results on the two calcium carbonates as originally produced, as well as after treatment in the hammer mill, are all given in Table VIII.

Table VIII

| Calcium Carbonate | Per Cent casein requirement | Per cent reduction in casein requirement based on the original as 100% | Oil absorption | Per cent reduction in oil absorption based on the original as 100 | Per Cent Gloss | Per cent increase in gloss based on the original as 100% |
|---|---|---|---|---|---|---|
| Example 7 | 23 | | 42 | | 42 | |
| Example 7, passed through hammer mill 10 times | 11 | 52 | 30 | 29 | 55 | 31 |
| Companion prior art | 15 | | 31 | | 41 | |
| Companion prior art, passed through hammer mill 10 times | 8 | 47 | 23 | 26 | 39 | −5 |

It will be noted from Table VIII that, although the casein requirement and oil absorption of Example 7 calcium carbonate are not so low as the corresponding values for the companion prior art calcium carbonate, the percentage reduction obtained in both oil absorption and casein reduction is somewhat greater in the treated Example 7 calcium carbonate than in the treated companion prior art calcium carbonate, and the values for these properties for the treated Example 7 calcium carbonate are within reasonable limits of what is commercially desired. But what is chiefly noteworthy is that the calcium carbonate of Example 7, although originally being only very slightly higher in gloss than the prior art calcium carbonate, is very substantially improved in gloss by subsequent treatment, whereas the companion prior art calcium carbonate is actually somewhat lowered in gloss by subsequent treatment. This illustrates that the calcium carbonate of the present invention produced under these conditions possesses the valuable characteristic of being susceptible to greater improvement, particularly as to gloss, by subsequent treatment than is the prior art calcium carbonate.

EXAMPLE 8

This was conducted exactly the same as Example 7, except that the temperature of carbonation was approximately 93° C. instead of the approximately 54–57° C. of Example 7. A companion experiment was likewise carried out, the same as Example 8 with the exception that, as before, the slaked lime, instead of being subjected to such mechanical processing action, was treated according to the prior art practice by subjecting it to vigorous agitation. The calcium carbonates produced were tested as previously, and then were subjected to the same subsequent treatment as given the Example 7 calcium carbonate and its companion prior art calcium carbonate, being passed 10 times through a hammer mill, and the so-treated calcium carbonates were tested. The results on the two calcium carbonates as originally produced as well as after treatment in the hammer mill, are all given in Table IX.

by means of paddles a fine mist or spray of slurry from a shallow pool in a carbonating vessel. The paddles were mounted on a rotating horizontal shaft which extended lengthwise of the carbonating vessel, the tips of the paddles dipping into the pool of slurry at the paddles' lowermost position. Such spraying of a lime slurry into gas containing carbon dioxide is described in the Statham and Leek Patent No. 2,081,112, and I employed a similar method and carbonating vessel (absorber) to that described therein, with the exception, of course, that my slaked lime had been previously treated as indicated above.

The concentration of the carbon dioxide employed was 100%, but inasmuch as there was always, above the pool of slurry in the carbonating vessel, a volume of air into which the carbon dioxide was introduced, the actual concentration of carbon dioxide in the gas above the slurry was of course much less than 100%, but its actual concentration could not be readily determined because of the presence of slaked lime spray. The concentration of the slaked lime slurry carbon-

*Table IX*

| Calcium Carbonate | Per cent casein requirement | Per cent reduction in casein requirement based on the original as 100% | Oil absorption | Per cent reduction in oil absorption based on the original as 100 | Per Cent Gloss | Per cent increase in gloss based on the original as 100% |
|---|---|---|---|---|---|---|
| Example 8 | 27 | | 34 | | 43 | |
| Example 8, passed through hammer mill 10 times | 11 | 59 | 27 | 21 | 50 | 16 |
| Companion prior art | 18 | | 27 | | 33 | |
| Companion prior art, passed through hammer mill 10 times | 8 | 56 | 23 | 17 | 34 | 3 |

It will be noted from Table IX that although the casein requirement and oil absorption of Example 8 calcium carbonate are not so low as the corresponding values for its companion prior art calcium carbonate, the percentage reduction obtained in both oil absorption and casein requirement by subsequent treatment is slightly greater in the treated Example 8 calcium carbonate than in the treated companion prior art calcium carbonate, and that the values for these properties for the treated Example 8 calcium carbonate are reasonably close to the values desired in commercial practice. It is particularly to be noted, however, that Example 8 calcium carbonate has a substantially higher gloss than its companion prior art calcium carbonate, and is very much more improved in gloss by subsequent treatment than is its companion prior art calcium carbonate, which again illustrates the marked improvement brought about by the present invention.

EXAMPLE 9

I subjected the slaked lime treated in Procedure F, in slurry form, to gas containing carbon dioxide. This was done by whipping into the gas ated was such that, after carbonation was completed, it contained approximately 18% calcium carbonate by weight. The temperature of carbonation was approximately 53–57° C. The shaft carrying the paddles was revolved sufficiently rapidly to produce a fine mist or spray from the pool in the carbonating vessel.

I then carried out a companion experiment, like Example 9 in every respect except that the slaked lime slurry was not previously subjected, prior to carbonation, to such mechanical processing action, but was only subjected to the prior art practice of being whipped by the paddles into a fine spray during the carbonation, the same as in Example 9 during carbonation and as described in Patent No. 2,081,112.

The calcium carbonates produced were tested as previously, and then were subjected to the same subsequent treatment as given in Example 8, i. e. were passed 10 times through a hammer mill, and the so-treated calcium carbonates were also tested. The results on the two calcium carbonates as originally produced, as well as after treatment in the hammer mill, are given in Table X.

*Table X*

| Calcium Carbonate | Per Cent casein requirement | Per cent reduction in casein requirement based on the original as 100% | Oil absorption | Per cent reduction in oil absorption based on the original as 100 | Per Cent Gloss | Per cent increase in gloss based on the original as 100% |
|---|---|---|---|---|---|---|
| Example 9 | 35 | | 47 | | 45 | |
| Example 9, passed through hammer mill 10 times | 15 | 57 | 37 | 21 | 52 | 16 |
| Companion prior art | 32 | | 44 | | 36 | |
| Companion prior art, passed through hammer mill 10 times | 14 | 56 | 33 | 25 | 43 | 19 |

It is seen from Table X, that Example 9 calcium carbonate made by the general procedure of Patent No. 2,081,112, excepting only for subjecting the slaked lime prior to carbonation to such mechanical processing action, is reasonably like the companion prior art calcium carbonate produced by the process of Patent No. 2,081,112 in respect to casein requirement and oil absorption; and while the gloss of both calcium carbonates is improved by subsequent treatment, nevertheless the gloss both before and after treatment is substantially better for Example 9 calcium carbonate of the present invention than it is for the companion prior art calcium carbonate.

In this connection it is to be noted that a sample, which I have tested, of calcium carbonate commercially produced by the prior art process of Patent No. 2,081,112, does not exhibit as good characteristics, in respect to improvement in gloss by subsequent treatment, as does the experimental sample of prior art calcium carbonate made by the process of that patent, and reported in Table X, in that I found that said commercial sample was not improved in gloss, but rather was even slightly decreased in gloss, by subjection to a hammer mill treatment.

EXAMPLE 10

I subjected the slaked dolomitic lime treated in Procedure G, in slurry form to a gas containing carbon dioxide. The concentration of the carbon dioxide in the gas employed was approximately 22%, and the concentration of the slaked dolomitic lime slurry carbonated was such that, after carbonation was completed, the slurry contained approximately 20% of the calcium carbonate magnesium basic carbonate by weight. The temperature of carbonation was approximately 60° C. The apparatus employed was the same as that used in Example 5. The carbonation was continued until a sample withdrawn from the mix gave a residue of ignition of substantially 50–51%. The composition of the pigment produced was the same as that described in Rafton Patent No. 2,049,021, issued July 28, 1936, and the method employed was also the same as in said patent with the exception only that in the present instance the slaked dolomitic lime was subjected to such mechanical processing action in paste form before carbonation.

I then carried out a companion experiment like Example 10 in every respect except that the slaked dolomitic lime, instead of being subjected, prior to carbonation, to such mechanical processing action, was only subjected to the agitation customarily given the slaked dolomitic lime in the prior art as described in Patent No. 2,049,021.

The pigments produced were tested as previously herein, and were then subjected to the same subsequent treatment as given in Example 9, i. e. were passed 10 times through a hammer mill, and the so-treated pigments were also tested. The results on the two pigments as originally produced, as well as after treatment in the hammer mill, are given in Table XI.

*Table XI*

| Calcium carbonate magnesium basic carbonate | Per Cent casein requirement | Per cent reduction in casein requirement based on the original as 100% | Oil absorption | Per cent reduction in oil absorption based on the original as 100 | Per Cent Gloss | Per cent increase in gloss based on the original as 100% |
|---|---|---|---|---|---|---|
| Example 10 | 55 | | 86 | | 60 | |
| Example 10, passed through hammer mill 10 times | 21 | 62 | 68 | 21 | 74 | 23 |
| Companion prior art | 45 | | 80 | | 55 | |
| Companion prior art, passed through hammer mill 10 times | 20 | 56 | 59 | 26 | 67 | 22 |

It is seen from Table XI that Example 10 pigment made by the general procedure of Patent No. 2,049,021, excepting only for subjecting the slaked dolomitic lime prior to carbonation to such mechanical processing action, is not quite so good as the companion prior art calcium carbonate magnesium basic carbonate produced by the process of Patent No. 2,049,021 in respect to casein requirement and oil absorption, but by subsequent treatment arrives at approximately the same casein requirement, with a somewhat higher oil absorption. However the gloss, both before and after treatment, is better for Example 10 pigment of the present invention than it is for the companion prior art pigment, and that is sufficiently important from a commercial standpoint to constitute a desired improvement in the pigment.

In each pair of the above examples and companion tests, the same supply of quicklime was used for producing the slaked lime employed therein. In all the above examples and companion tests the carbonation was carried out for convenience at substantially atmospheric pressure, but it is to be understood that the comparative results obtained are, in general, analogous whether the carbonation be carried out at atmospheric pressure, subatmospheric pressure or superatmospheric pressure. Moreover, for convenience, the concentration of the gas containing carbon dioxide employed was in most cases approximately 22%, but this may be varied from 100% down to a fraction of 1% if desired, with, in general, analogous comparative differences in results. Likewise changes may be made in the other variables involved, such for example as in the temperature, vigor of agitation, concentration of slurry, rate of carbonation employed, and the like, but here again the same relative differences are found between the pigment comprising calcium carbonate of the present invention and the comparative pigment of the prior art, taking into consideration, of course, the differences in the characteristics and quality which changes in these variables are known to produce.

I have given as examples pigment comprising calcium carbonate produced by the general procedure of several prior art methods, the methods being changed, however, in respect to the fact that the slaked lime used was subjected in the presence of water, prior to carbonation, to such mechanical processing action until an increase was effected in its settling test of not less than 10% of the original value of said test. I have shown in the tables and in the discussion the improvements obtained over the corresponding prior art pigments. I have used as illustrations of prior art methods of producing calcium carbonate: (1) that shown in Patent No. 2,058,503, both in the range in which the process of that patent produces a gelatinous calcium carbonate and in the range in which the non-gelatinous variety is produced; (2) that shown in general in Patent No. 2,058,503, but above the temperature range of that patent; and (3) that shown in Patent No. 2,081,112. It is to be understood, however, that my invention is not limited to the carbonation of slaked lime by such prior art methods, as I may employ any method of carbonating slaked lime with carbon dioxide, a large number of which are known. I have likewise used as an illustration of a prior art method of producing calcium carbonate in association with another compound, e. g. calcium carbonate magnesium basic carbonate, the general procedure shown in Patent No. 2,049,021. The process of that patent produces a specific type of calcium carbonate magnesium basic carbonate, but in that patent there is described a number of other processes for producing calcium carbonate magnesium basic carbonate of somewhat different characters and compositions by the treatment of slaked dolomitic lime with carbon dioxide under other condtions. It is to be understood that all those so-described calcium carbonate magnesium basic carbonate materials, as well as others similarly produced, where the slaked lime is not completely dissolved by the carbon dioxide in the process, are susceptible of substantial improvement by utilizing the method disclosed herein in connection with their manufacture. For example, in the treatment of slaked dolomitic lime with carbon dioxide to extract about two thirds of the magnesia present as magnesium bicarbonate, which is separated as a solution from the residue for subsequent recovery of the magnesia, the residue consists of calcium carbonate magnesium basic carbonate containing only approximately one third of the magnesia originally present in the dolomitic lime. The residue has been used as a pigment, and said process which produces that pigment, when employing the slaked dolomitic lime after treatment as described herein, produces a pigment of quality substantially improved over that previously obtained. Likewise there are many other processes wherein magnesia is separated in whole or in part from slaked dolomitic lime by various reagents, and the insoluble residues from such processes, whether calcium or magnesium compounds, or both, are improved by pretreatment of the slaked dolomitic lime employed as described herein.

Furthermore, a calcium carbonate magnesium carbonate or basic carbonate product may be made by mixing slaked lime slurry, made, if desired, from a high calcium quicklime, with magnesium hydroxide slurry and then carbonating the combined slurries. In this case, also, the product may be improved by pretreating the slaked lime in the manner described herein, and sometimes it is also desirable to pretreat the magnesium hydroxide, either in paste or slurry form, in the manner described herein for slaked lime, and mix the two pretreated slurries, prior to carbonation; or the two slurries may be mixed before treatment, and the mixed slurry treated, and then carbonated; or material other than magnesium hydroxide may be mixed with slaked lime prior to carbonation, treatment being given as just indicated, and co-precipitated with the calcium carbonate. Moreover, by carbonating slaked dolomitic lime with carbon dioxide in quantity sufficient only to carbonate the calcium hydroxide present, calcium carbonate magnesium hydroxide is produced; or by using somewhat more carbon dioxide a mixture of that compound and calcium carbonate magnesium basic carbonate is produced; and those materials also are procured of an improved quality when the slaked dolomitic lime employed has been previously treated as described herein.

When I produce pigment by subjecting slaked lime to carbon dioxide, the carbon dioxide, when it reacts with slaked lime which has been subjected to such mechanical processing action, may be present either in the form of a gas, in the form of a solution in water, in the form of calcium bicarbonate or magnesium bicarbonate, or in more than one of the above forms. In respect to the carbon dioxide being present in the form of such bicarbonates, it is well known that calcium carbonate can be made by the treatment of a solution of calcium bicarbonate with slaked lime. A common example of the practice of this procedure is in the purification or "softening" of hard water where calcium and/or magnesium bicarbonate with or without additional free carbon dioxide is naturally present either alone or with other dissolved materials. When slaked lime is added to such hard water, calcium carbonate is precipitated either in relatively pure form, or containing other materials according to the original composition of the water, for example sometimes magnesium hydroxide or magnesium carbonate or basic carbonate, as well as impurities of iron and the like. Sometimes other reagents such as sodium carbonate and/or alum are also added to secure a more complete precipitation. Also where the water contains other ingredients in addition to the calcium bicarbonate, which ingredients, however, are less apt than the calcium to cause difficulty in the subsequent use of the water if they are not removed therefrom, a so-called "selective" softening is sometimes practiced. Slaked lime (with or without other reagents such as sodium carbonate and/or alum) is used to remove by precipitation only the calcium bicarbonate and/or other bicarbonate and/or free carbon dioxide content of the water, either in whole or in part, or with only minor quantities of the other constituents of the water; and, after filtration, centrifuging, sedimentation or the like, of the precipitate formed, the remainder of the constituents still in soluble form are permitted to remain in the water, which may subsequently be treated by recarbonation, addition of polyphosphates or the like. This gives a partially purified, not completely softened, water, but nevertheless a water which is satisfactory for many purposes.

The calcium carbonate derived in such manner and from such processes, and removed by any of the methods indicated, whether such calcium carbonate is substantially pure or contains other ingredients, is improved in respect to the various qualities, as already indicated in general, when slaked lime treated as described herein is used. However, because of the fact that the calcium in the calcium carbonate may not all be derived from the slaked lime, but partly from the calcium bicarbonate dissolved in the water treated, the improvements may not in some cases be so great as those illustratively disclosed herein.

It is now clear that any method of producing pigment comprising calcium carbonate by the reaction of carbon dioxide in any of its forms, as described above, with slaked lime treated as described herein gives pigments comprising calcium carbonate of markedly improved qualities.

I shall now give examples of pigments produced with slaked lime treated as described herein, by reaction with an alkaline earth carbonate such as sodium carbonate.

Having treated my slaked lime by subjection in the presence of water to such mechanical processing action until an increase is effected in its settling test of not less than 10% of the original value of said test, I then react it with sodium carbonate to form calcium carbonate, if it be a high calcium lime, or to form calcium carbonate magnesium hydroxide if it be a lime containing magnesia such as dolomitic lime. This reaction between lime and sodium carbonate is, of course, known as a causticizing reaction, and usually is carried out in liquid or slurry form in an aqueous medium in any of the apparatus customarily used, such as in a tank provided with an agitator, preferably one which produces vigorous agitation, for example a turbo-mixer agitator. The reaction may be carried out at a relatively high temperature or at a lower temperature, as is well known in the art. It may be carried out in one stage, generally employing a considerable excess of sodium carbonate; or more usually, and preferably, it is carried out in two stages, in the first of which a stoichiometrical excess of lime is used to obtain a sodium hydroxide liquor of high causticity, and in the second of which a stoichiometrical excess of sodium carbonate is used in order that the calcium hydroxide content of the lime shall be substantially completely converted to calcium carbonate.

When the process is carried out in one stage, there follows a separation of the liquor from the pigment, and then preferably a thorough washing of the pigment, after which it is ready for use directly or after being dried. When the process is carried out in two stages, there is a separation of the liquor from the pigment after the first stage and also after the second stage, usually by filtration, the pigment after the second stage being well washed to remove substantially all of the associated liquor, whereupon, as before, it is ready for use directly, or after being dried.

A screening or other operation for separation of grit or oversize is customarily practiced at an appropriate point in the process, e. g. on the lime after slaking, and/or prior to filtration in the single stage process, and/or prior to filtration in the second stage in the two stage process. The liquor from the single stage process usually contains considerable sodium carbonate which is objectionable for some purposes and the liquor is customarily treated subsequently to remove part or all of this. The liquors from the two stage process which contain sodium hydroxide with a minor amount of sodium carbonate, may be combined and utilized for any purpose desired.

The causticizing process is also practiced in a continuous manner, as is well known in the art, but this procedure, when practiced as is usual with continuous settling, is in general applicable only to rapid settling pigments comprising calcium carbonate and is not generally used where it is desired to produce the finer grades.

To illustrate the results obtained in my process, I shall present data on pigments comprising calcium carbonate made according to the prior art wherein the lime is slaked with agitation and vigorously conditioned under the optimum practice of the prior art; and I shall also present data on corresponding pigments made according to my process employing slaked lime which has been subjected to such mechanical processing action, so that the differences between the pigments made by the prior art practice and by my process will be fully demonstrated. Slaked lime to produce the pigments according to the prior art was made by the below described Procedures H and J, and to produce pigments according to the present invention by the below described Procedures I and K. As stated previously, while I may use any of the apparatus indicated for subjecting slaked lime to such mechanical processing action, I prefer the Rafton Mill and the hammer mill as they are particularly effective; and in Procedures I and K a hammer mill was employed.

A description of Procedures H, I, J and K is now given.

Procedure H

A sample of high calcium lime was slaked in water, using the water near boiling. Sufficient water was used to produce a mud-like consistency, which required about four parts by weight of water to one part by weight of lime with the particular lime employed, and the lime was given thorough agitation both during the slaking and after the slaking was completed, which corresponds to the optimum conditions for producing slaked lime given in the prior art. This constituted, therefore, a supply of slaked high calcium lime in mud-like form containing water, produced by the optimum practice of the prior art, and a portion of this supply was held for use in the manufacture of calcium carbonate according to prior art methods. The remainder of this supply was treated for use in the process of my present invention as indicated in Procedure I below.

Procedure I

Part of the supply of slaked high calcium lime produced in Procedure H was subjected in mud-like form containing water to the action of a hammer mill, having a peripheral velocity of approximately 350 feet per second. The mud-like slaked lime containing water was introduced radially through a port in the side of the mill casing, by means of a screw conveyor, into the path of the rotating hammers, and was discharged directly through an opening at the bottom of the mill. The slaked lime was passed through this mill ten times.

Procedure J

A sample of dolomitic lime was slaked in water, using the water near boiling. Sufficient water was used to produce a mud-like consistency, which required about two and a quarter parts by weight of water to one part by weight of lime with the particular lime employed, and the lime was given thorough agitation both during the slaking and after the slaking was completed, which corresponds to the optimum conditions for producing slaked lime given in the prior art. This constituted, therefore, a supply of slaked dolomitic lime in mud-like form containing water, produced by the optimum practice of the prior art, and a portion of this supply was held for use in the manufacture of calcium carbonate magnesium hydroxide according to prior art methods. The remainder of this supply was treated for use in the process of my present invention as indicated in Procedure K below.

PROCEDURE K

Part of the supply of slaked dolomitic lime produced in Procedure J was subjected in mud-like form containing water to the action of a hammer mill, having a peripheral velocity of approximately 350 feet per second. As in Procedure I, the mud-like slaked lime containing water was introduced radially through a port in the side of the mill casing, by means of a screw conveyor, into the path of the rotating hammers, and was discharged directly through an opening at the bottom of the mill. The slaked lime was passed through this mill ten times.

High calcium lime of the quality used in Procedure H when slaked in the manner of Procedure H and then given 10 passes through a hammer mill as in Procedure I, is increased in settling test, due to the treatment of Procedure I, 67% based on the original test of the slaked lime prior to the treatment. Dolomitic lime of the quality used in Procedure J when slaked in the manner of Procedure J and then given 10 passes through a hammer mill as in Procedure K, is increased in settling test, due to the treatment of Procedure K, 30% based on the original test of the slaked lime prior to treatment.

The slaked high calcium lime containing water of Procedure H and that of Procedure I were then each reacted in companion tests with sodium carbonate to produce pigment comprising calcium carbonate, according, respectively, to the methods of the prior art and of the present invention. Two sets of these companion tests were performed, in one set the reaction was conducted at a relatively high temperature, and in the other set at a temperature below substantially 70° C. Similar series were then carried out with the slaked dolomitic lime containing water of Procedure J and that of Procedure K. The examples given below describe the various methods of preparation of the pigments comprising calcium carbonate which were thus produced. Four examples of the prior art methods, namely Examples 11, 12, 13 and 14 are given, and also four corresponding examples according to the method of the present invention, namely Examples 11N, 12N, 13N and 14N ("N" standing for "New"), arranged in companion tests as Examples 11 and 11N, 12 and 12N, 13 and 13N, and 14 and 14N.

EXAMPLE 11

121.6 grams (dry basis) of the slaked high calcium lime containing water of Procedure H was diluted with water to 600 cc., and mixed at a temperature of boiling with 450 cc. of an aqueous solution containing 157.5 grams of sodium carbonate. The reaction was carried out at substantially boiling temperature in a vessel under conditions of vigorous agitation, employing a turbo-mixer agitator, for a half hour. The mixture was then filtered on a suction funnel, the filter cake was washed once with 500 cc. of water, and then was made up with water to 900 cc. and returned to the original vessel. It was heated to a boiling temperature, 150 cc. of an aqueous solution containing 26.3 grams of sodium carbonate was added, and the mixture vigorously agitated as before at substantially boiling temperature for a half hour. The mixture was screened through a fine mesh sieve, then filtered on a suction funnel, and the calcium carbonate was washed with water substantially free from adhering alkali. The prior art process used in Example 11 is that exemplified by such patents as Alton No. 1,379,157 and O'Connor No. 2,211,908.

EXAMPLE 11N

The process of Example 11 was followed with the exception that the slaked high calcium lime containing water of Procedure I was substituted for the slaked high calcium lime containing water of Procedure H.

EXAMPLE 12

The process of Example 11 was followed with the exception of the temperature. The slaked high calcium lime containing water of Procedure H and diluting water was mixed with the aqueous solution of sodium carbonate at substantially 25° C., and agitated at that temperature. The same apparatus was used as in Example 11, and the filtration was carried out in the same manner. The second stage of the process with addition of the second portion of aqueous solution of sodium carbonate was then completed. The prior art process used in Example 12 is that exemplified by such patents as Brooks & Rafton No. 2,062,255 and Allen & Lynn No. 2,140,375.

EXAMPLE 12N

The process of Example 12 was followed with the exception that the slaked high calcium lime containing water of Procedure I was substituted for the slaked high calcium lime containing water of Procedure H.

EXAMPLE 13

190.7 grams (dry basis) of the slaked dolomitic lime containing water of Procedure J was diluted with water to 685 cc., and mixed at a temperature of boiling with 415 cc. of an aqueous solution containing 162.5 grams of sodium carbonate. The reaction was carried out at substantially boiling temperature in a vessel under conditions of vigorous agitation, employing a turbo-mixer agitator, for a half hour. The mixture was then filtered on a suction funnel, the filter cake was washed once with 500 cc. of water, and then was made up with water to 900 cc. and returned to the original vessel. It was heated to a boiling temperature, 200 cc. of an aqueous solution containing 12.5 grams of sodium carbonate was added, and the mixture vigorously agitated as before at substantially boiling temperature for a half hour. The mixture was screened through a fine mesh sieve, then filtered on a suction funnel, and the calcium carbonate magnesium hydroxide was washed with water substantially free from adhering alkali.

EXAMPLE 13N

The process of Example 13 was followed with the exception that the slaked dolomitic lime containing water of Procedure K was substituted for the slaked dolomitic lime containing water of Procedure J.

EXAMPLE 14

The process of Example 13 was followed with the exception of the temperature. The slaked dolomitic lime containing water of Procedure J and diluting water was mixed with the aqueous solution of sodium carbonate at substantially 25°

C., and agitated at that temperature. The same apparatus was used as in Example 13, and the filtration was carried out in the same manner. The second stage of the process with addition of the second portion of aqueous solution of sodium carbonate was then completed, in this case using 200 cc. greater volume of total mix because of the greater volume of the calcium carbonate magnesium hydroxide prepared under these conditions. The prior art process used in Example 14 is that exemplified by such patent as Brooks & Rafton No. 2,066,066.

EXAMPLE 14N

The process of Example 14 was followed with the exception that the slaked dolomitic lime containing water of Procedure K was substituted for the slaked dolomitic lime containing water of Procedure J.

The pigments comprising calcium carbonate produced in the above examples were then subjected to a series of tests conducted as previously described herein. The results of the tests performed on the pigments produced in Examples 11 and 11N, 12 and 12N are given in Table XII, and of those performed on the pigments produced in Examples 13 and 13N, 14 and 14N are given in Table XIII. The percent increases or percent decreases shown are those of the N examples of the present invention in comparison with the corresponding examples of the prior art.

test of Example 11N is even somewhat better than, and the gloss about the same as, Example 12. It is, moreover, to be noted that in comparison with Example 12, the calcium carbonate of Example 11N is slightly better in oil absorption but somewhat worse in casein requirement. It is thus apparent that by my present process I can produce by causticizing at a relatively high temperature calcium carbonate (Example 11N) which not only is greatly superior to prior art calcium carbonate produced at that temperature (Example 11), but which is almost, if not substantially, equal to the much higher quality prior art calcium carbonate made at a temperature below substantially 70° C. (Example 12).

It is noted, furthermore, that the improvement in the calcium carbonate of my process over that of the prior art, when made at a relatively high temperature (Example 11N over 11), is much greater as to most of its properties than the relative improvement shown when it is made at a temperature below substantially 70° C. (Example 12N over 12). This is to be expected because, as indicated above, the prior art calcium carbonate when made at below substantially 70° C. (Example 12), is of a quality much higher than that made at a relatively high temperature (Example 11), and thus naturally there does not exist the possibility of effecting relatively so great an improvement over the former as over the latter. However, an examination of the data

*Table XII*

| Example | Settling test | Per cent increase in settling test | Oil absorption | Per cent decrease in oil absorption | Per cent casein requirement | Per cent decrease in casein requirement | Per cent gloss | Per cent increase in gloss |
|---|---|---|---|---|---|---|---|---|
| 11 | 19 | | 48 | | 29 | | 40 | |
| 11 N | 46 | 142 | 42 | 13 | 26 | 10 | 62 | 55 |
| 12 | 39 | | 46 | | 20 | | 63 | |
| 12 N | 43 | 10 | 43 | 7 | 15 | 25 | 73 | 16 |

*Table XIII*

| Example | Settling test | Per cent increase in settling test | Oil absorption | Per cent decrease in oil absorption | Per cent casein requirement | Per cent decrease in casein requirement | Per cent gloss | Per cent increase in gloss |
|---|---|---|---|---|---|---|---|---|
| 13 | 14 | | 38 | | 26 | | 47 | |
| 13 N | 29 | 107 | 33 | 13 | 24 | 8 | 55 | 17 |
| 14 | 46 | | 32 | | 28 | | 68 | |
| 14 N | 44 | −4 | 28 | 13 | 21 | 25 | 69 | 1 |

An examination of Table XII shows the improvement in the calcium carbonates made according to Examples 11N and 12N, in which my invention was practiced, over the corresponding calcium carbonates made in Examples 11 and 12, according to the prior art. Specifically it is noted that the settling test is increased, the oil absorption is decreased, the casein requirement is decreased, and the gloss is increased—all improvements in quality. Particularly notable is the very great increase in settling test, and the very considerable increase in the gloss, of the calcium carbonate of the present invention made at a relatively high temperature (Example 11N) in comparison with the respective values of the corresponding prior art calcium carbonate (Example 11). Furthermore on comparing Example 11N with Example 12, which is the prior art calcium carbonate made at a temperature below substantially 70° C., it is seen that the settling shows that the improvement of the calcium carbonate of the present invention over the prior art, when made at a temperature below substantially 70° C. (Example 12N over 12), is, nevertheless, substantial, and particularly useful is the increase in gloss shown.

An examination of Table XIII shows, in general, an improvement of the pigments of the present invention (Examples 13N and 14N) over the corresponding pigments of the prior art (Examples 13 and 14) similar to that shown in Table XII, except that here the relative improvement, in certain qualities at least, particularly in gloss, seems to be somewhat less. This relatively lesser improvement is, however, to be expected as here the calcium carbonate is not 100%, but only about 63%, of the total pigment comprising calcium carbonate, the remainder in this instance being magnesium hydroxide. But even as to gloss, a worth while improvement is obtained, particularly in Example 13N of the present invention over Example 13 of the prior art (both made at a relatively high temperature). In general, Example 13N is substantially improved over Example 13, and while it does not so nearly approach in quality Example 14 (prior art made below substantially 70° C.), as Example 11N approaches Example 12, nevertheless it represents a substantial improvement, and pigment comprising calcium carbonate (calcium carbonate magnesium hydroxide) of this quality (Example 13N) is not obtainable by the prior art method at the same temperature (Example 13). In the comparison of Example 14N with Example 14 (both made at below substantially 70° C.), here again, as in the corresponding situation in Table XII, it is seen that there is not so much difference as there is between Example 13N and Example 13, but it is substantial as to some of the properties and represents a distinct improvement. As to the slight decrease in settling test noted in Example 14N over Example 14, it can be stated that this difference is of little consequence because the two settling tests are already so near the maximum test of 50 that the pigments of both Examples 14N and 14 would be considered of excellent grade as to that particular quality.

In short, then, it is clear that the data presented in Tables XII and XIII demonstrate conclusively the substantial improvement in quality of pigment comprising calcium carbonate made by the present invention over that of the prior art, both when the causticizing reaction is carried out at a relatively high temperature as well as at a temperature below substantially 70° C.; that the improvement appears to be somewhat greater with the use of high calcium than with the use of dolomitic lime; that with both limes the improvement seems to be relatively greater when the causticization is carried out at relatively high temperature than when carried out at a temperature below substantially 70° C.; that by the present invention there can be produced pigment comprising calcium carbonate of improved characteristics, notably as to gloss; and that for the first time, so far as is known, it is now possible to produce in the causticizing process when conducted at a relatively high temperature a calcium carbonate which has a settling test substantially as high as the calcium carbonate which hitherto was producible only when the causticizing reaction was carried out at a temperature below substantially 70° C. As will be readily understood, all this constitutes an important advance in the art.

It is to be understood that the procedures and examples given herein are for purposes of illustration only, and are not, of course, to be considered as limiting.

As has been pointed out, the causticizing reaction, whether conducted at a relatively high temperature or below substantially 70° C., may be carried out as a one stage or as a two stage process. While the disposal of the concomitantly produced liquor containing sodium hydroxide presents different problems in the one stage and the two stage processes, the characteristics of the pigment comprising calcium carbonate produced are substantially the same whichever process be employed.

As is indicated in some of the prior art cited, when carrying out the causticizing reaction at below substanially 70° C., whether in the single stage process or in the first stage of the two stage process, the important point is that the temperature should be maintained at below substantially 70° C. for an original period during which the slaked lime and sodium carbonate are reacted. This may vary from about a few minutes up to an hour or more, depending among other things upon the vigor of agitation and the concentration of the mix, but once this period has passed, the mix may then be raised to a relatively high temperature, e. g. to boiling, without substantial effect on the character of the pigment comprising calcium carbonate which is produced. As will be apparent, this subsequent raising of temperature has, however, one very practical advantage among others, namely it permits very much faster filtration. Moreover, the second stage of the two stage process may be carried out either: (1) at a temperature below substantially 70° C., or (2) at this temperature followed by a relatively high temperature, or (3) originally at a relatively high temperature; without substantial effect on the character of the pigment comprising calcium carbonate. Here again procedures (2) or (3) provide the practical advantage, among others, of faster filtration and washing of the pigment.

The several procedures outlined in the paragraph above may, therefore, be considered substantial equivalents insofar as the character of the pigment comprising calcium carbonate produced is concerned, but certain of them, as indicated, offer practical operating advantages.

Instead of using sodium carbonate for reaction with my treated slaked lime, I may use other soluble carbonates, for example the carbonates of the alkali metals, potassium and lithium, as well as the rarer caesium and rubidium, and these all are to be considered the substantial equivalents of sodium carbonate for the purposes of the present invention.

In my Patent No. 2,189,832, issued February 13, 1940, page 1, column 2, line 16, through page 3, column 2, line 6, there is described a method of causticizing which employs sodium bicarbonate directly, or sodium carbonate in combination with carbon dioxide. When I speak of causticizing herein, I intend to include such variations of the causticizing reaction as mentioned in the above referred to section of said patent; and where in the claims I use the term "soluble carbonate" or "sodium carbonate," I intend to include therein "soluble bicarbonate" and "sodium bicarbonate," respectively. Where the word "soluble" is used, it is intended, of course, to mean soluble in water.

Where I speak herein of a "relatively high temperature," I mean a temperature above substantially 70° C.

The pigment comprising calcium carbonate of the present invention made by the causticizing process may after production be treated to improve its casein requirement, its oil absorption, its gloss and the like, by one or more of the various processes referred to herein for the treatment of pigment. I find that the pigment comprising calcium carbonate of the present invention made by the causticizing process is, in many cases, more susceptible to improvement by such a treatment than is the corresponding prior art pigment, and, in any event, the values finally reached for a number of properties in the pigment comprising calcium carbonate of the present invention after treatment indicate a pigment of better quality than the corresponding prior art pigment similarly treated, the pigment of the present invention in most cases having a lower casein requirement, a lower oil absorption, and particularly a higher gloss.

Where I mention improvement in gloss obtained in my process for the purpose of differentiating the pigment comprising calcium carbonate of the present invention from the prior art pigment, it is not, however, to be understood thereby that other tests or characteristics of said pigment may not also be changed; and although such improvement has use in respect to the employment of said pigment in coated paper, it may not necessarily have any specific use in the employment of said pigment for other purposes, but it is nevertheless, an adequate criterion of the useful change which has taken place in said pigment whereby said pigment is improved for purposes of use other than in coated paper.

Adhesives have been mentioned herein as addition agents, in the presence of which the slaked lime may be treated. While some of the adhesives may act as protective agents and aid, for example, in the eventual production of a finer particle size calcium carbonate. I may use protective agents other than adhesives (some of which may also be wetting agents), such as the sulphated higher alcohols, a number of which are on the market, sulphonated castor oil and similar products, as well as soaps, and also gums, such as arabic, karaya, tragacanth and the like. I may also use coating agents, e. g. certain oils, which have proved effective particularly in preventing agglomeration of the calcium carbonate produced, when dried, such as cocoanut oil, lard oil, rosin oil, palm oil, sperm oil, soya bean oil, olive oil, various kinds of fish oils, as well as hydrogenated oils and fats, the latter usually requiring somewhat higher temperatures to maintain them in liquid form. However, as such coating agents are attacked by the sodium hydroxide formed in the subsequent causticizing reaction when the calcium carbonate is so formed, if I employ them for calcium carbonate made by the causticizing reaction, I prefer to add them later after removal of the sodium hydroxide.

If I use an addition agent, I may, if desired, remove it after the slaked lime has been treated and before reacting the slaked lime to form the carbonate, e. g., if the addition agent be one which is soluble in water, I may wash it out of the treated slaked lime, or I may leave the addition agent with the slaked lime during the reaction, and, if desired, add more of the same, or other addition agent, thereto. After the reaction, the addition agent may be allowed to remain with the calcium carbonate or may be removed as desired. Furthermore, when the slaked lime is treated in my process in the absence of an addition agent, I may, if desired, add an addition agent such as indicated herein, e. g. in the amounts indicated herein, after the treatment of the slaked lime, and either before or during the reaction to form the carbonate, so that the reaction may take place in whole or in part in the presence of the addition agent; or in certain cases it may be added after the reaction. After the reaction, the addition agent if previously added, may be allowed to remain with the calcium carbonate or may be removed in whole or in part as desired. Among the addition agents which may be used in the reaction, I have found calgon to be particularly desirable, as, among other things, it appears, in certain cases, to reduce the casein requirement of the calcium carbonate produced besides imparting other beneficial qualities; and also the coating agents are very useful, particularly if the calcium carbonate is to be dried before use. Of course, in certain cases, the addition agent added may react in whole or in part with the slaked lime and/or calcium carbonate, and in such case it may not be removable.

I have previously proposed in a number of my copending applications, e. g. Serial Nos. 346,661, filed July 20, 1940, (now Patent No. 2,385,379, issued September 25, 1945), 436,196, filed March 25, 1942, (now Patent No. 2,383,509, issued August 29, 1945), 449,492, filed July 2, 1942, (now abandoned and replaced by application Serial No. 718,649, filed Dec. 27, 1946, which issued as Patent No. 2,447,532 of August 24, 1948), 453,469, filed August 3, 1942, (now abandoned and replaced by application Serial No. 740,831, filed April 11, 1947, which issued as Patent No. 2,451,448 of October 12, 1948), and 455,367, filed August 19, 1942, (now abandoned and replaced by application Serial No. 706,907, filed October 31, 1946, which issued as Patent 2,498,005 of February 21, 1950), to treat pigments made from slaked lime, by compression or compression and attrition, by passing through a nozzle and against a target if desired, and by striking; and other pigment treatments such as prolonged ball milling, kneading and the like have also been proposed. However, so far as I know, no one, prior to my invention, has ever treated in such a manner, in the presence of water, the slaked lime to be used in pigment manufacture, and this sharply distinguishes my invention from the prior art pigment treating processes.

Where I speak of a "ball type" mill, I mean to include any apparatus employing tumbling attrition elements, for example ball mills, pebble mills, rod mills and tube mills.

Where in the claims I speak of "lime" without qualification as to composition, I mean to include not only high calcium lime, but also lime containing magnesia, such as dolomitic lime.

Where in the claims the processing of slaked lime is said to take place "in the presence of liquid water," the word "liquid" refers only to the state of the water.

My copending application Serial No. 170,488, filed June 26, 1950, the disclosure of which is made a part hereof, and to which cross reference is hereby made, comprises subject matter disclosed but not claimed herein, to which claims are presented therein.

While I have described in detail the preferred embodiments of my invention, it is to be understood that the details of procedure, the types of apparatus, the proportion of ingredients and the arrangement of steps may be widely varied without departing from the spirit of my invention or the scope of the subjoined claims.

I claim:

1. In a method for the manufacture of pigment, the improvement which comprises subjecting slaked lime for use in the manufacture of said pigment, in the presence of liquid water, said liquid water being present in an amount not less than 30% on the combined weight of the slaked lime and the liquid water, to the percussive action of percussive members of a rotor element, said members having a peripheral velocity of not less than 30 feet per second, said slaked lime being propelled by said percussive members away from and out of the path of travel of said percussive members, until, by said percussive action, the settled volume, measured in cubic centimeters, of a suspension of said slaked lime after substantially complete settling of the slaked lime in a standardized settling test, wherein 4.0 grams (dry basis) of the slaked lime is made up with water to exactly 50 cubic centimeters in a 2 ounce bottle graduated in cubic centimeters, shaken thoroughly and allowed to stand for 16 hours, is increased not less than 10% of the original value of said test, said standardized settling test being conducted upon a suspension prepared solely from slaked lime and water, said original value having been determined upon the slaked lime in question slaked under conditions of temperature, agitation and proportion of lime to water, which, for that particular lime, produce a slaked lime with the greatest wet bulk.

2. A method according to claim 1 in which the settled volume in said settling test is increased not less than 25% of the original value of said test.

3. A method according to claim 1 in which the settled volume in said settling test is increased not less than 50% of the original value of said test.

4. A method according to claim 1 in which said slaked lime is a slaked high calcium lime.

5. A method according to claim 1 in which said slaked lime is a slaked dolomitic lime.

6. A method according to claim 1, in which said slaked lime in the presence of liquid water is subjected to the percussive action in paste form.

7. A method according to claim 1, in which said slaked lime in the presence of liquid water is subjected to the percussive action in slurry form.

8. A method according to claim 1 in which the percussive members of the rotor element have a peripheral velocity of not less than 100 feet per second.

9. A method according to claim 1 in which the percussive members of the rotor element have a peripheral velocity of not less than 200 feet per second.

10. A method according to claim 1 in which the percussive members are hammers.

11. A method according to claim 1 in which the percussive members are teeth.

12. In a method for the manufacture of pigment comprising calcium carbonate, the improvement which comprises subjecting slaked lime for use in the manufacture of said pigment, in the presence of liquid water, said liquid water being present in an amount not less than 30% on the combined weight of the slaked lime and the liquid water, to the percussive action of percussive members of a rotor element, said members having a peripheral velocity of not less than 30 feet per second, said slaked lime being propelled by said percussive members away from and out of the path of travel of said percussive members, until, by said percussive action, the settled volume, measured in cubic centimeters, of a suspension of said slaked lime after substantially complete settling of the slaked lime in a standardized settling test, wherein 4.0 grams (dry basis) of the slaked lime is made up with water to exactly 50 cubic centimeters in a 2 ounce bottle graduated in cubic centimeters, shaken thoroughly and allowed to stand for 16 hours, is increased not less than 10% of the original value of said test, said standardized settling test being conducted upon a suspension prepared solely from slaked lime and water, said original value having been determined upon the slaked lime in question slaked under conditions of temperature, agitation and proportion of lime to water, which, for that particular lime, produce a slaked lime with the greatest wet bulk, and then reacting said slaked lime, which has been subjected to said percussive action, in the presence of water with a reagent adapted to produce a carbonate with said slaked lime, to form said pigment, said pigment, in comparison with the corresponding pigment produced when said slaked lime is similarly reacted but without subjecting it initially to said percussive action, being of an improved quality in respect to at least one of the properties of settling test, oil absorption, casein requirement and gloss-imparting quality.

13. In a method for the manufacture of pigment comprising calcium carbonate, the improvement which comprises subjecting slaked lime for use in the manufacture of said pigment, in the presence of liquid water, said liquid water being present in an amount not less than 30% on the combined weight of the slaked lime and the liquid water, to the percussive action of percussive members of a rotor element, said elements having a peripheral velocity of not less than 30 feet per second, said slaked lime being propelled by said percussive members away from and out of the path of travel of said percussive members, until, by said percussive action, the settled volume, measured in cubic centimeters, of a suspension of said slaked lime after a substantially complete settling of the slaked lime in a standardized settling test, wherein 4.0 grams (dry basis) of the slaked lime is made up with water to exactly 50 cubic centimeters in a 2 ounce bottle graduated in cubic centimeters, shaken thoroughly and allowed to stand for 16 hours, is increased not less than 10% of the original value of said test, said standardized settling test being conducted upon a suspension prepared solely from slaked lime and water, said original value having been determined upon the slaked lime in question slaked under conditions of temperature, agitation and proportion of lime to water, which, for that particular lime, produce a slaked lime with the greatest wet bulk, and then reacting said slaked lime, which has been subjected to said percussive action, in the presence of an amount of water, insufficient to dissolve the calcium hydroxide content of said slaked lime, with carbon dioxide to form said pigment, said pigment, in comparison with the corresponding pigment produced when said slaked lime is similarly reacted but without subjecting it initially to said percussive action, being of an improved quality in respect to at least one of the properties of settling test, oil absorption, casein requirement and gloss-imparting quality.

14. A method according to claim 13, in which said slaked lime is reacted, in the presence of water, with the carbon dioxide by leading gas containing said carbon dioxide into the body of the slurry comprising said slaked lime and water, under the surface of said slurry.

15. A method according to claim 13, in which the pigment is calcium carbonate, the slaked lime is slaked high calcium lime, and in which said slaked high calcium lime is reacted, in the presence of water, with the carbon dioxide by leading gas containing said carbon dioxide into the body of the slurry comprising said slaked high calcium lime and water, under the surface of said slurry, while maintaining said slurry at a temperature below substantially 50° C., the concentration of said slurry being such as to contain not over substantially 15% by weight of calcium carbonate when the reaction has been completed.

16. A method according to claim 13, in which the pigment is calcium carbonate, the slaked lime is slaked high calcium lime, and in which said slaked high calcium lime is reacted, in the presence of water, with the carbon dioxide by bringing gas containing said carbon dioxide into contact with the slurry comprising said slaked high calcium lime and water when said slurry is in the form of a spray.

17. In a method for the manufacture of pigment comprising calcium carbonate, the improvement which comprises subjecting slaked lime for use in the manufacture of said pigment, in the presence of liquid water, said liquid water being present in an amount not less than 30% on the combined weight of the slaked lime and the liquid water, to the percussive action of percussive members of a rotor element, said members having a peripheral velocity of not less than 30 feet per second, said slaked lime being propelled by said percussive members away from and out of the path of travel of said percussive members, until, by said percussive action, the settled volume, measured in cubic centimeters, of a suspension of said slaked lime after substantially complete settling of the slaked lime in a standardized settling test, wherein 4.0 grams (dry basis) of the slaked lime is made up with water to exactly 50 cubic centimeters in a 2 ounce bottle graduated in cubic centimeters, shaken thoroughly and allowed to stand for 16 hours, is increased not less than 10% of the original value of said test, said standardized settling test being conducted upon a suspension prepared solely from slaked lime and water, said original value having been determined upon the slaked lime in question slaked under conditions of temperature, agitation and proportion of lime to water, which, for that particular lime, produce a slaked lime with the greatest wet bulk, and then reacting said slaked lime, which has been subjected to said percussive action, in the presence of water with a soluble carbonate to form said pigment, said pigment, in comparison with the corresponding pigment produced when said slaked lime is similarly reacted but without subjecting it initially to said percussive action, being of an improved quality in respect to at least one of the properties of settling test, oil absorption, casein requirement and gloss-imparting quality.

18. A method according to claim 17, in which the soluble carbonate is sodium carbonate, and in which the slaked lime is reacted with said sodium carbonate at a temperature above 70° C.

19. A method according to claim 17, in which the soluble carbonate is sodium carbonate, and in which the slaked lime is reacted with said sodium carbonate at a temperature below 70° C.

20. A method according to claim 17, in which the pigment is calcium carbonate magnesium hydroxide and the slaked lime is slaked dolomitic lime.

HAROLD R. RAFTON.

REFERENCES CITED

The following references are of record in the file of this patent:

UNITED STATES PATENTS

| Number | Name | Date |
|---|---|---|
| 955,814 | Leet | Apr. 19, 1910 |
| 1,266,339 | Statham | May 14, 1918 |
| 1,372,193 | Roon | Mar. 22, 1921 |
| 1,410,087 | Welch | Mar. 21, 1922 |
| 1,552,024 | Alton | Sept. 1, 1925 |
| 1,583,759 | Mathers | May 4, 1926 |
| 1,634,424 | Hunter | July 5, 1927 |
| 1,664,598 | Dittlinger | Apr. 3, 1928 |
| 1,780,821 | Henderson | Nov. 4, 1930 |
| 2,033,954 | Rafton | Mar. 17, 1936 |
| 2,049,021 | Rafton | July 28, 1936 |
| 2,058,503 | Rafton et al. | Oct. 27, 1936 |
| 2,062,255 | Brooks et al. | Nov. 24, 1936 |
| 2,066,066 | Brooks et al. | Dec. 29, 1936 |
| 2,068,039 | Rafton | Jan. 19, 1937 |
| 2,081,112 | Statham et al. | May 18, 1937 |
| 2,140,375 | Allen et al. | Dec. 13, 1938 |
| 2,141,458 | Bates | Dec. 27, 1938 |
| 2,149,269 | Brooks | Mar. 7, 1939 |
| 2,163,385 | Sullivan | June 20, 1939 |
| 2,188,663 | McClure et al. | Jan. 30, 1940 |
| 2,196,949 | Young | Apr. 9, 1940 |
| 2,211,908 | O'Connor | Aug. 20, 1940 |
| 2,447,532 | Rafton | Aug. 23, 1948 |
| 2,451,448 | Rafton | Oct. 12, 1948 |

OTHER REFERENCES

"Lime and Magnesia," by Knibbs, D. Van Nostrand Co., N. Y., 1924, pages 51–53.